(12) United States Patent
Norstedt et al.

(10) Patent No.: US 9,782,845 B2
(45) Date of Patent: Oct. 10, 2017

(54) INDEXABLE MILLING CUTTING INSERT

(71) Applicant: SANDVIK INTELLECTUAL PROPERTY AB, Sandviken (SE)

(72) Inventors: Anders Norstedt, Sandviken (SE); Ulrik Sunnvius, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/303,643

(22) PCT Filed: Feb. 18, 2015

(86) PCT No.: PCT/EP2015/053369
§ 371 (c)(1),
(2) Date: Oct. 12, 2016

(87) PCT Pub. No.: WO2015/158449
PCT Pub. Date: Oct. 22, 2015

(65) Prior Publication Data
US 2017/0036280 A1 Feb. 9, 2017

(30) Foreign Application Priority Data
Apr. 16, 2014 (EP) .................................. 14164906

(51) Int. Cl.
B23C 5/20 (2006.01)
B23C 5/22 (2006.01)
B23C 5/24 (2006.01)

(52) U.S. Cl.
CPC ............ *B23C 5/2252* (2013.01); *B23C 5/207* (2013.01); *B23C 5/2208* (2013.01); *B23C 5/2221* (2013.01); *B23C 5/2427* (2013.01); *B23C 2200/045* (2013.01); *B23C 2200/32* (2013.01); *B23C 2200/363* (2013.01);
(Continued)

(58) Field of Classification Search
CPC .......... B23C 2200/045; B23C 2200/32; B23C 2200/363; B23C 2200/367; B23C 2210/163; B23C 2210/168; B23C 5/207; B23C 5/205; B23C 5/2247; Y10T 407/23;
(Continued)

(56) References Cited

U.S. PATENT DOCUMENTS

| 2005/0019113 | A1 | 1/2005 | Wermeister |
| 2012/0034041 | A1* | 2/2012 | Koga ........................ B23C 5/06 407/103 |

(Continued)

FOREIGN PATENT DOCUMENTS

| JP | 05016011 A | * | 1/1993 | |
| JP | 2013144356 A | * | 7/2013 | ............... B23C 5/06 |

*Primary Examiner* — Daniel Howell
*Assistant Examiner* — Nicole N Ramos
(74) *Attorney, Agent, or Firm* — Corinne R. Gorski

(57) ABSTRACT

An indexable milling cutting insert includes an opposed outside and inside, a periphery, and a plurality of homologous and alternately individually usable cutting edges, which are equidistantly spaced apart from a center axis, which extends between the outside and inside. The cutting insert includes a plurality of countersunk chip channels, which are delimited by bottoms and tangentially spaced-apart ridges, which individually include a cutting edge formed between a chip surface included in a first chip channel, and a clearance surface, which borders on a second chip channel.

8 Claims, 8 Drawing Sheets

Figure 1:
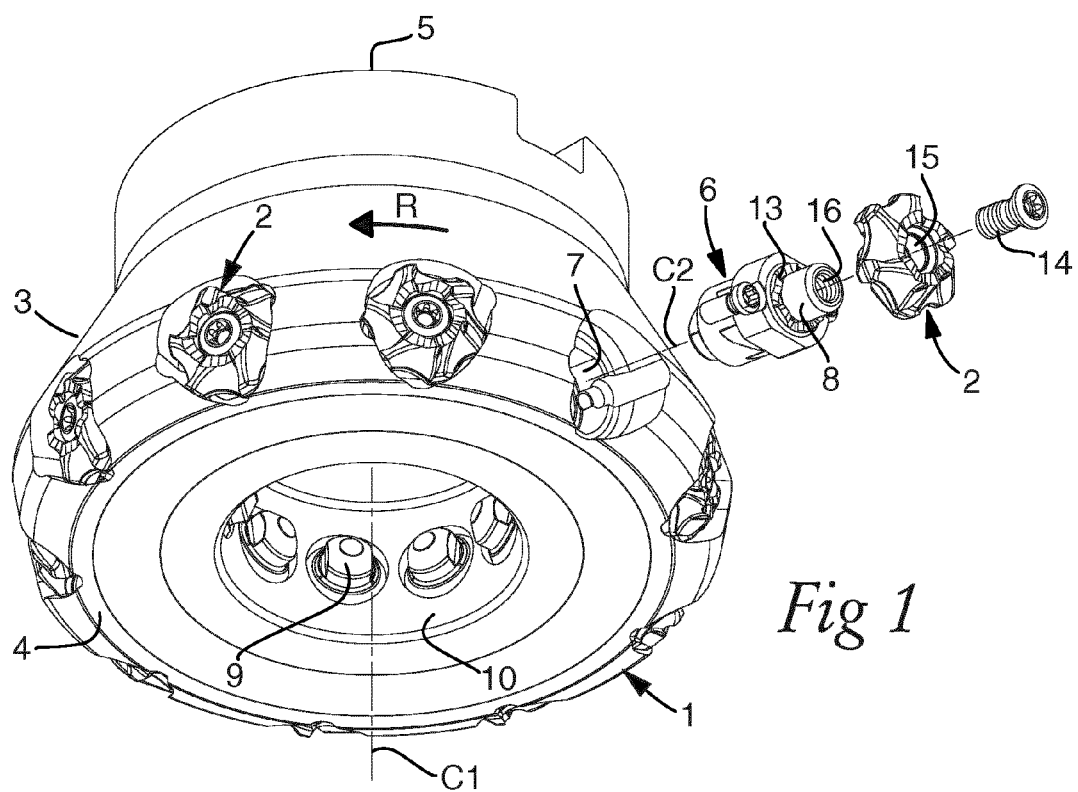

(52) U.S. Cl.
CPC .. *B23C 2200/367* (2013.01); *B23C 2210/163* (2013.01); *B23C 2210/168* (2013.01); *Y10T 407/235* (2015.01); *Y10T 407/24* (2015.01)

(58) Field of Classification Search
CPC ............... Y10T 407/235; Y10T 407/24; Y10T 407/245; Y10T 407/192; Y10T 407/1924
See application file for complete search history.

(56) References Cited

U.S. PATENT DOCUMENTS

| | | |
|---|---|---|
| 2012/0195700 A1 | 8/2012 | Chen et al. |
| 2012/0201622 A1 | 8/2012 | Kocherovsky et al. |
| 2013/0195567 A1* | 8/2013 | Sunnvius ................ B23C 5/06 407/40 |
| 2013/0251464 A1 | 9/2013 | Hecht |
| 2013/0315680 A1 | 11/2013 | Ben Amor |

* cited by examiner

INDEXABLE MILLING CUTTING INSERT

RELATED APPLICATION DATA

This application is a §371 National Stage Application of PCT International Application No. PCT/EP2015/053369 filed Feb. 18, 2015 claiming priority of EP Application No. 14164906.1, filed Apr. 16, 2014.

TECHNICAL FIELD OF THE INVENTION

This invention concerns an indexable cutting insert for tools for chip removing machining, comprising a pair of opposite outsides and insides, a periphery, a centre axis, which extends between said outsides and insides, as well as a plurality of homologous and alternately individually usable cutting edges, which are rotationally symmetrically arranged in respect of the centre axis (C3).

In practice, cutting inserts of the above-mentioned type are used for cutting tools for the machining of workpieces of metal and similar materials, such as composites. The tools for which the cutting inserts are a matter of concern are primarily in the form of milling cutters, e.g., face and end mills.

By those skilled in the art, difference is made between radially mounted and tangentially mounted cutting inserts, when the tool is a milling tool. With radially mounted milling cutting inserts, reference is here made to cutting inserts, which are mounted on the milling cutter body so that they have the their centre axes tangentially and their principal planes radially oriented in relation to the milling cutter body. With tangentially mounted milling cutting inserts, reference is here made to cutting inserts, which are mounted on the milling cutter body so that they have their centre axes radially and their principal planes tangentially oriented in relation to the milling cutter body.

BACKGROUND OF THE INVENTION AND PRIOR ART

By US 2012/195700, an indexable cutting insert intended for milling tools is previously known, which is tangentially mounted and double-sided, i.e., includes two identical halves on both sides of a centre plane, each half including four alternately individually usable cutting edges. Thus, in total, the cutting insert includes eight individual, separately usable cutting edges.

A disadvantage of the above-mentioned cutting inserts is that the number of cutting edges on each side of the cutting insert is maximized to just four. Namely, if attempts to increase the number of cutting edges would be made using the present insert design, the cutting insert would become star-shaped, and each cutting edge would follow each an edge.

SUMMARY

The present invention aims at obviating at least the above-mentioned disadvantage of the cutting insert known by US 2012/195700 and at providing an improved cutting insert of the type that is indexable. An object of the invention is to provide a cutting insert, which is particularly suitable for milling tools and comprises more than four cutting edges per side, and which allows greater freedom to form each cutting edge.

According to the invention, the object is attained by the cutting insert mentioned by way of introduction having been given the features seen in the appended claim 1.

According to the invention, cutting edges are arranged on ridges, which are situated on the outside of the indexable milling cutting insert and which are tangentially spaced-apart by chip channels. The ridges extend from a central hub portion toward the periphery of the cutting insert. More precisely, each cutting edge is formed between a chip surface, which consists of a flank of the ridge in question, and a clearance surface, which is formed of a crown of the ridge in question. Thanks to the cutting edges being situated on ridges, the number of cutting edges is not limited by the number of edge sides of the cutting insert, but the indexable milling cutting insert according to the invention may be provided with a large number of ridges and the same number of cutting edges. Furthermore, thanks to the fact that the ridges can have an arbitrary extension between the hub portion and the periphery of the cutting insert, the cutting edges can be given a desired shape and angle for providing the desired cutting edge geometry in use. In previously known cutting inserts, where the cutting edges are situated at the peripheral edge sides of the cutting insert, the designing of the individual cutting edge is limited by requirements of the external geometry of the cutting insert. Thus, a cutting insert is obtained having large inherent strength at the same time as the cutting insert can be formed with a plurality of easy-cutting cutting edges in the area between the hub portion and the periphery of the cutting insert. Thus, the invention envisages the possibility of forming between five and seven cutting edges on single-sided cutting inserts (i.e., 10-14 cutting edges on double-sided cutting inserts).

With hub portion, reference is here made to a central area around the centre axis, and where appropriate, around a screw hole in the cutting insert intended for mounting. The ridges with their respective cutting edges extend like spokes outward from the hub portion.

The hub portion may be formed as a supporting portion intended to interact with a corresponding portion of a seat in a tool body when the cutting insert is mounted. For this, the hub portion may be provided with means for rotary locking of the cutting insert, for example a gear rim, suitable projections, or countersinks.

By the fact that the chip channel in front of the cutting edge is included in the proper cutting insert, rather than in the basic body, the chip flow will hit the cutting insert and thereby spare the basic body.

The indexable milling cutting insert according to the invention allows a tangential mounting on the basic body of a milling tool. When the cutting insert is mounted, a first one of the cutting edges of the cutting insert is used, all other cutting edges being inactive. When this first cutting edge has been worn to a specific extent, a new cutting edge can be indexed up by the cutting insert being detached from the seat, rotated and clamped once again.

The periphery of the cutting insert may be a line along which the outside and the inside meet. In other embodiments, the periphery may be situated in an edge side between the outside and inside of the cutting insert. Usually, the outside and inside of the cutting insert are formed by their principal planes.

In one embodiment, the cutting insert has a generally circular basic shape. This is advantageous in applications where the cutting insert is mounted countersunk in a recess in the basic body, in which the inactive cutting edges are well protected from hammering, hot chips, since the cutting insert then can be turned between different index positions as soon as possible clamping means has been released and it is lifted out far enough to go free from possible lock means.

In one embodiment, the clearance surface has a convexly arched shape in arbitrary sections transversely to the ridge, more precisely by coinciding with a geometrical surface of revolution situated between the outside and the periphery. In such a way, a possibility is given of a simple precision grinding of all cutting edges, more precisely by the fact that a grinding member can be wiped along the surface of revolution in which all cutting edges are located. In this application, with surface of revolution, reference is made to a surface that is generated by a curve in a plane which has been rotated around a straight line situated in the plane of the curve.

In one embodiment, the individual chip channel has a depth, which is the greatest nearest the chip surface, and which successively decreases toward an end in which the same transforms into a ridge being in front. In such a way, a good strength of the cutting insert is guaranteed at the same time as the chip evacuation from the cutting edge is facilitated.

In one embodiment, the bottom of the chip channel is in the form of a concave double-arched surface. Via this surface, the chip flow is guided from the cutting edge in a well-defined way.

Embodiments wherein the chip channels are formed so that the chip flows from the cutting edges are directed toward the bottoms of the chip channels, which are included in the proper cutting insert, are advantageous, since the chips thereby not at all or later contact the basic body, whereby the basic body, which should have a considerably greater service life than the cutting inserts, is spared.

In one embodiment, a peripherally outer boundary line of the chip channel is concavely curved and spaced apart radially inward from a circumscribed circle, which defines the periphery of the cutting insert. In such a way, the chip flow from the cutting edge is further facilitated.

In one embodiment, at least the main part of the main edge of an individual cutting edge—as viewed in plane elevation—is located tangentially behind an imaginary radius $r$ between the centre axis of the cutting insert and an end point of the main edge situated nearest the periphery. In this connection, behind refers to the workshop drawing that the cutting insert is aimed at. This means that the part in question of the main edge obtains a positive cutting geometry in so far that the same "digs" into the material of the workpiece and "lifts out" the chips from the same (rather than thrusting and shearing the material in front of itself, as at negative cutting geometries). In such a way, the cutting edge becomes particularly easy-cutting. In one embodiment, the entire main edge, that is, the part of the cutting edge that extends from an end point nearest the hub portion to an end point nearest the periphery, is located tangentially behind said imaginary radius r.

In one embodiment, the cutting insert is double-sided and invertible by including two identical, halves on both sides of a centre plane, which extends perpendicular to the centre axis of the cutting insert. The two halves of the cutting insert are identical so far that the inside is identical to the outside in the outwardly turned position of the respective side, or, in other words, the outside and the inside are rotationally symmetrical over an axis in the centre plane, which intersects the centre axis at a right angle. In such a way, the number of usable cutting edges is doubled in comparison with single-sided cutting inserts, simultaneously as the cutting edges on both sides are adapted to the same direction of rotation of the tool.

In the last-mentioned embodiment, the cutting insert may be formed in such a way that the ridges included in the respective halves intersect each other in pairs as viewed in an imaginary, transparent plane elevation. This crosswise disposition of the ridges contributes significantly to a good inherent strength of the cutting insert.

In one embodiment, the chip channels have bottoms, which extend between the ridges and out toward the periphery. Such bottoms contribute to giving the cutting insert a good inherent strength.

In another double-sided embodiment, the outside and the inside are mirror-inverted across a centre plane. Thereby, this milling cutting insert has one side that is adapted to clockwise rotation in a tool and one side that is adapted to anti-clockwise rotation in a tool.

In a particular aspect, the cutting insert according to the invention is suitable for mounting on a cutting edge exchange mechanism integrated in the milling cutter body, by means of which the cutting insert can be ejected from the milling cutter body and be turned from one index position to another, without being touched by any human hand.

BRIEF DESCRIPTION OF THE APPENDED DRAWINGS

Figure 2:
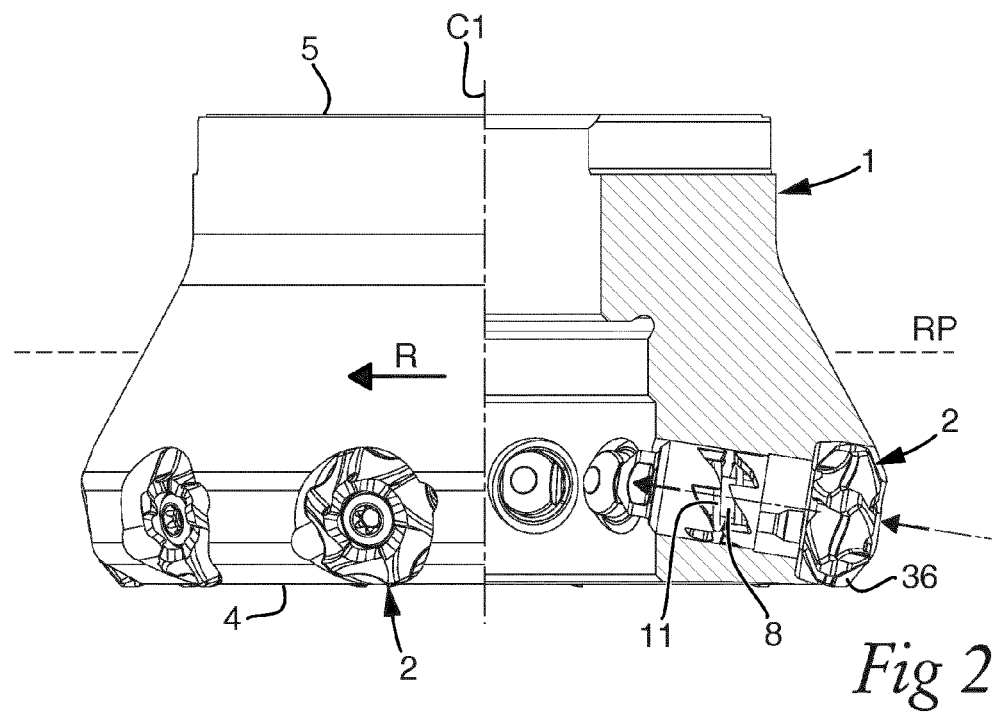
Figure 3:
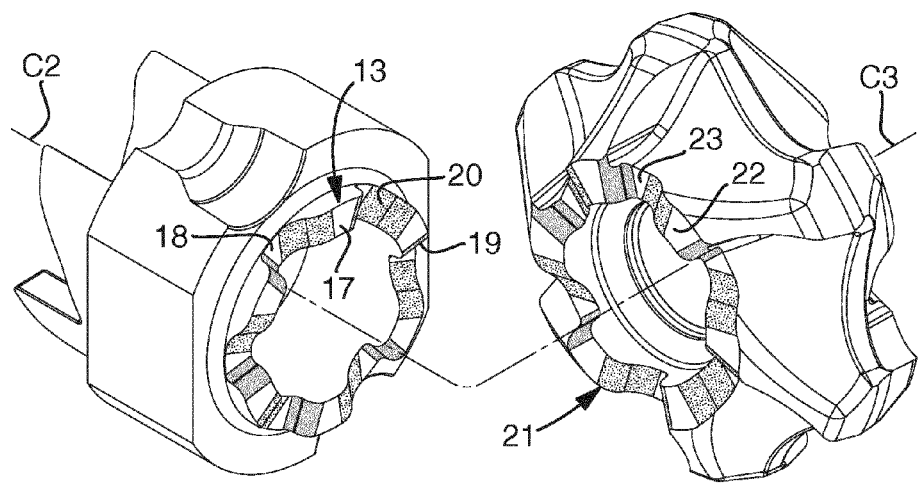
Figure 4:
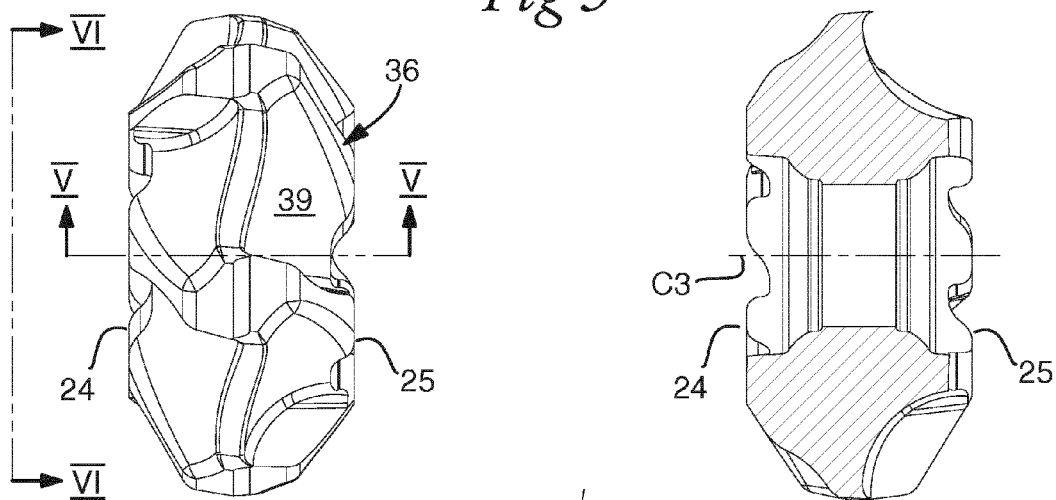
Figure 5:
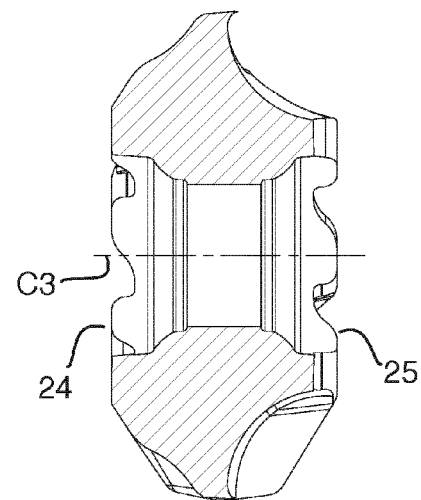
Figure 6:
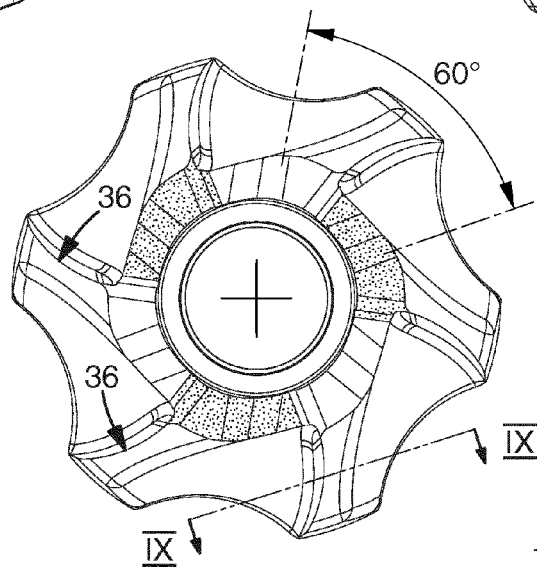
Figure 7:
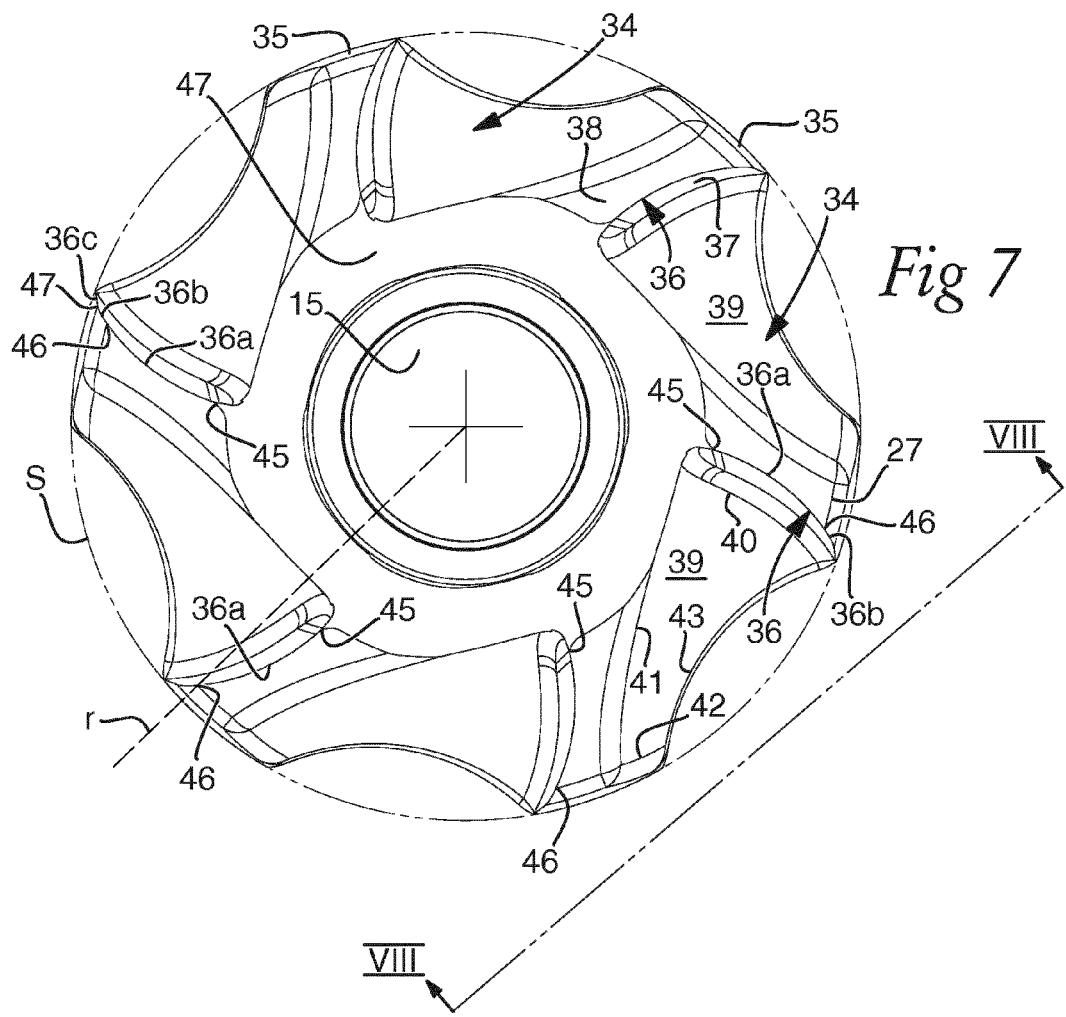
Figure 8:
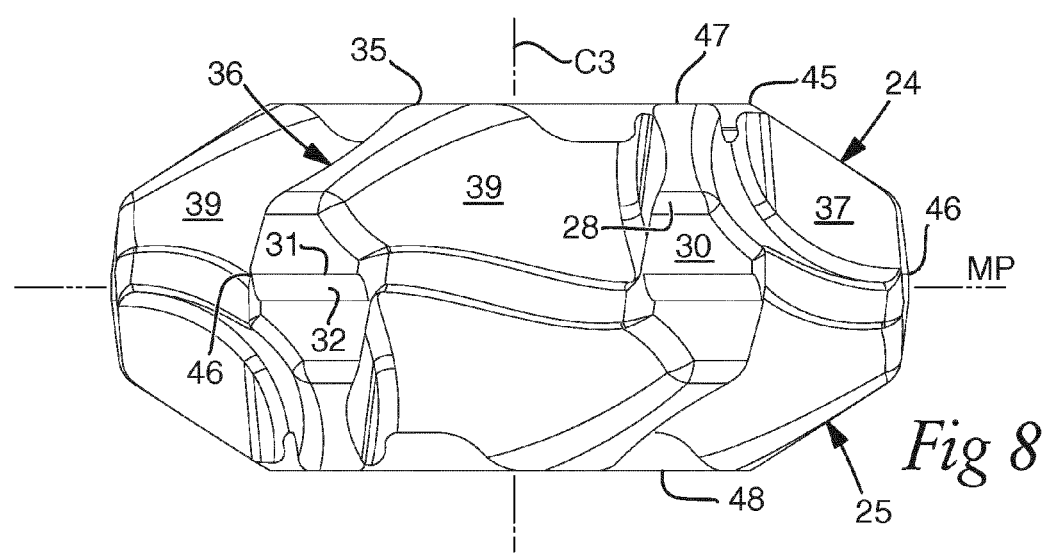
Figure 9:
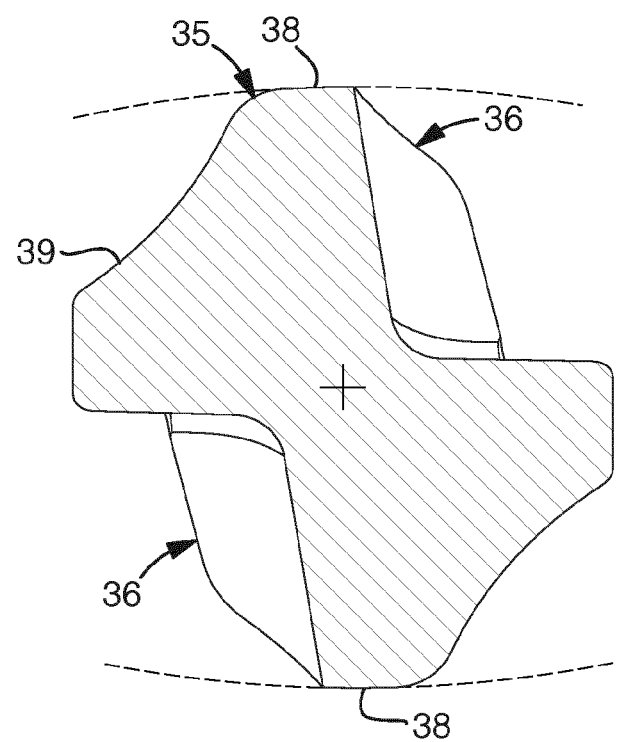
Figure 10:
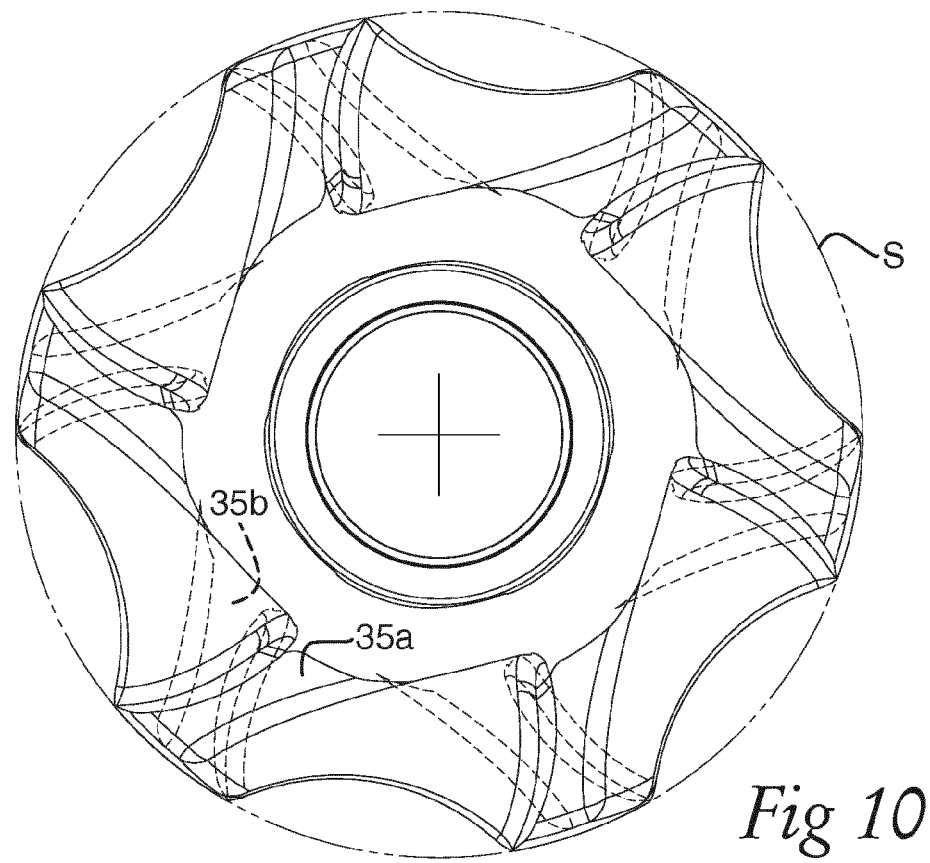
Figure 11:
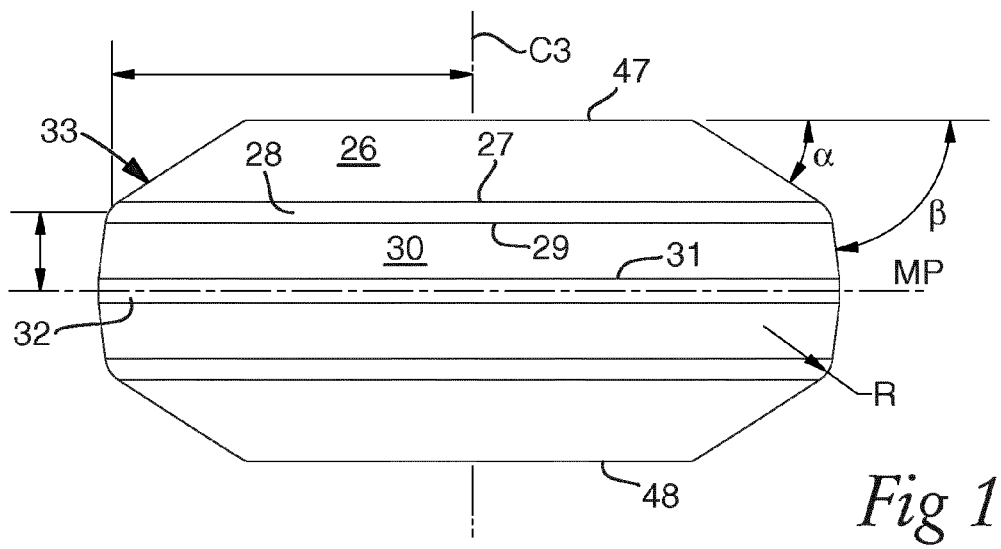
Figure 12:
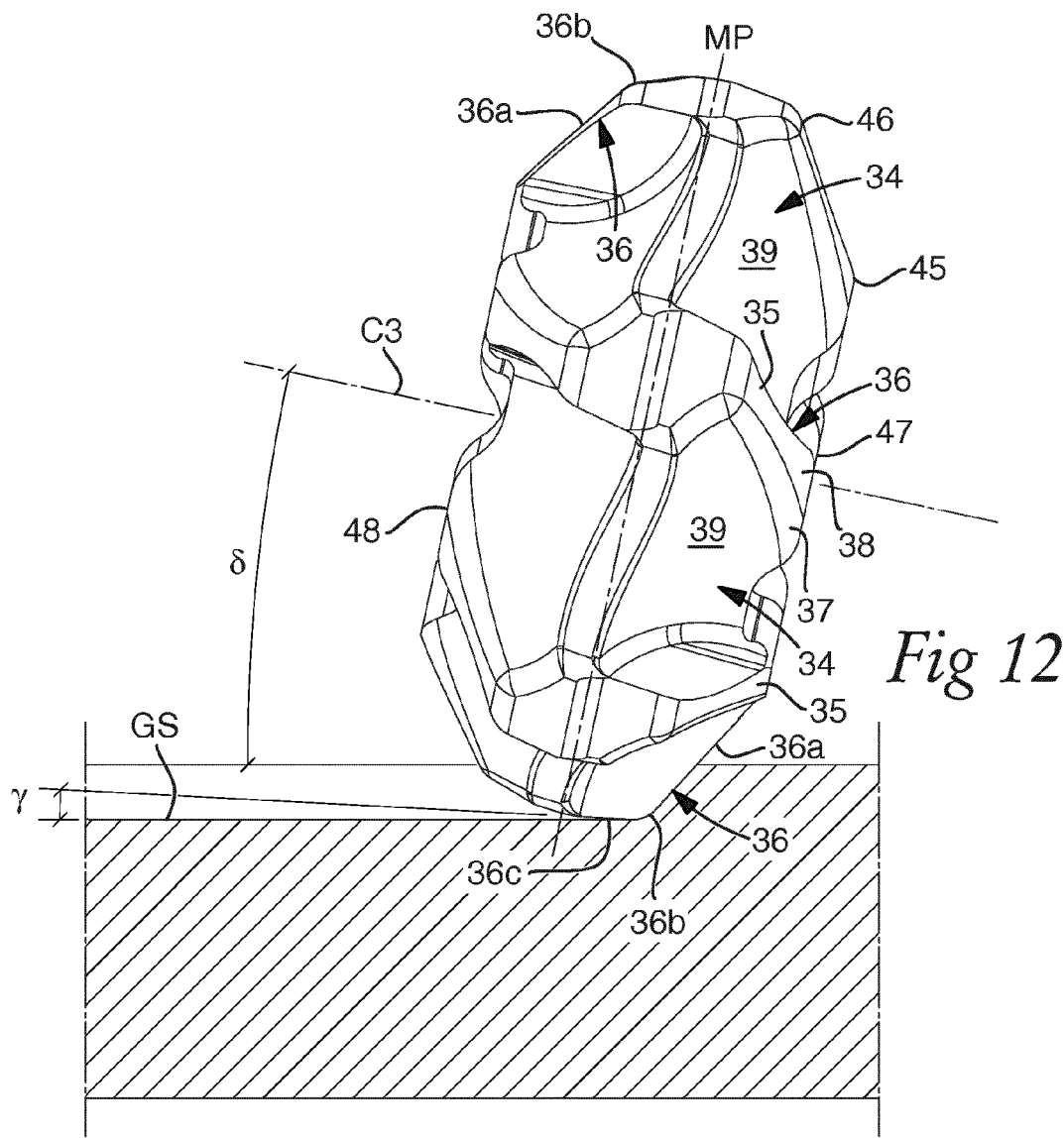
Figure 13:
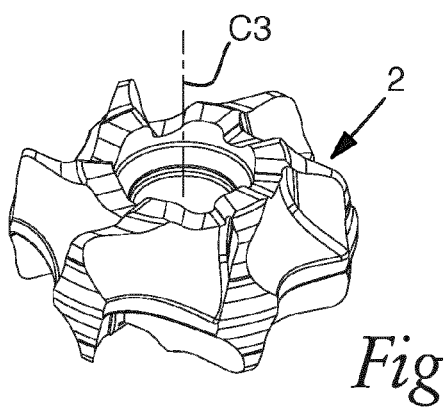
Figure 14:
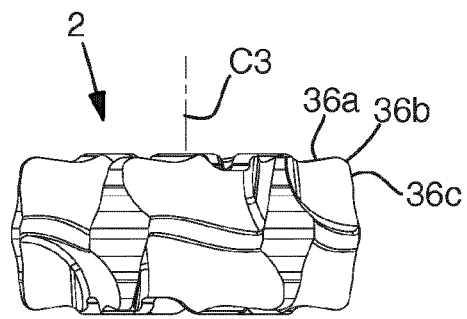
Figure 15:
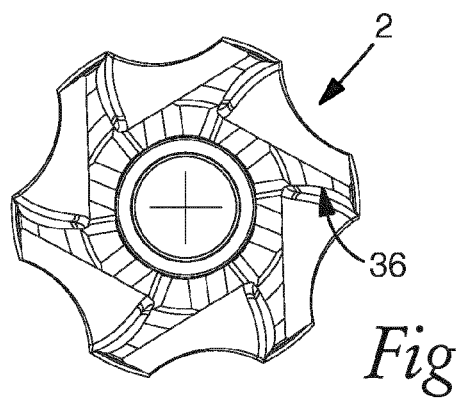
Figure 16:
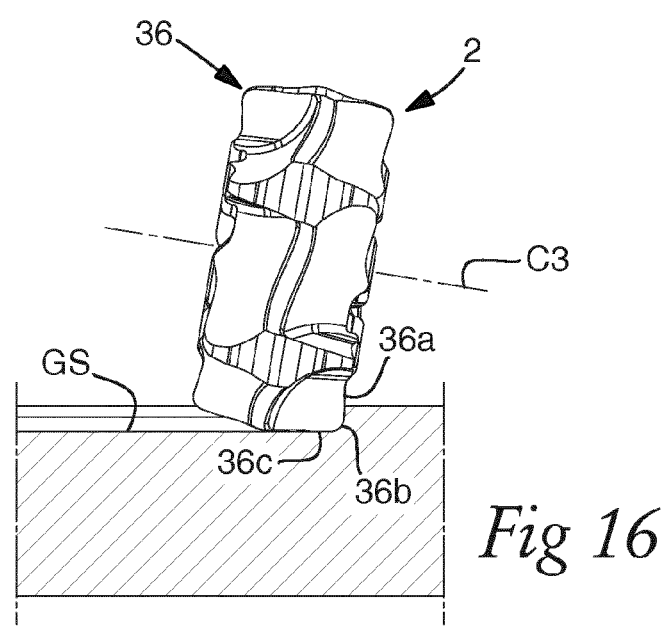
Figure 17:
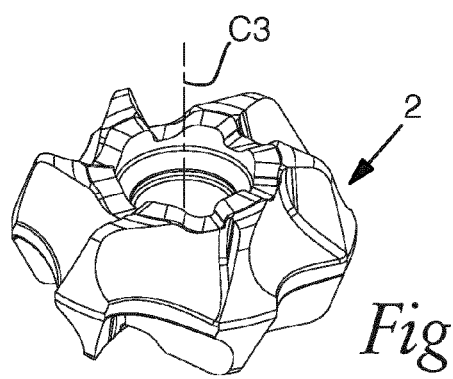
Figure 18:
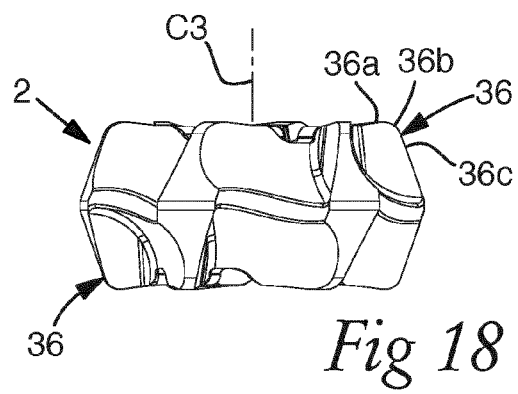
Figure 19:
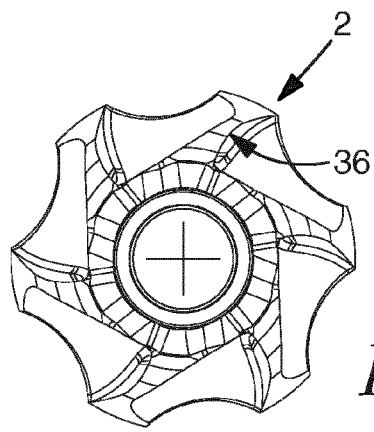
Figure 20:
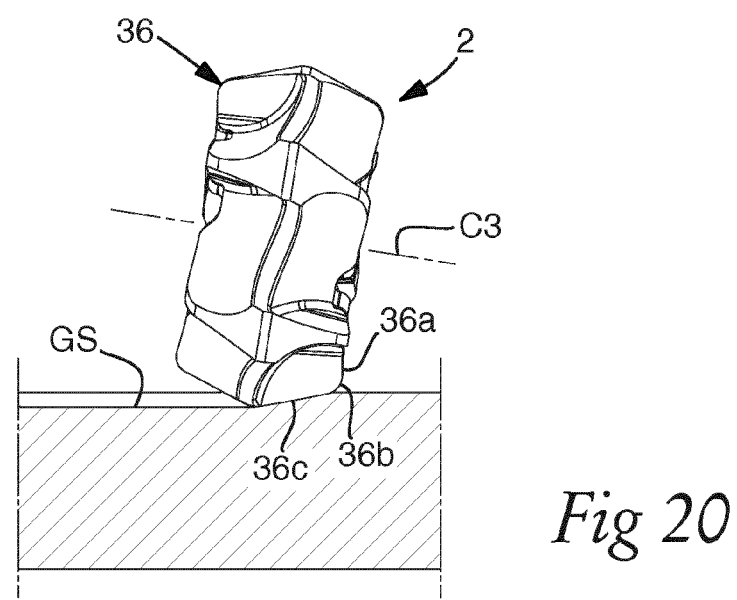
Figure 21:
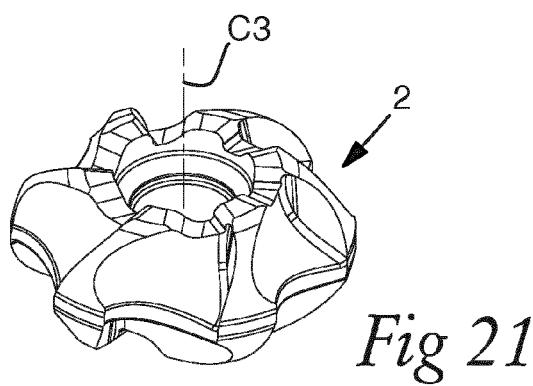
Figure 22:
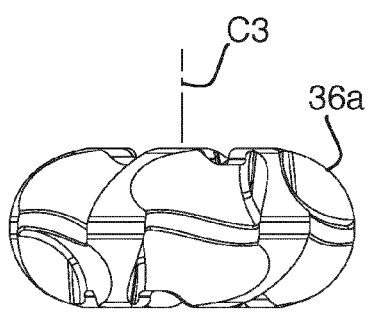
Figure 23:
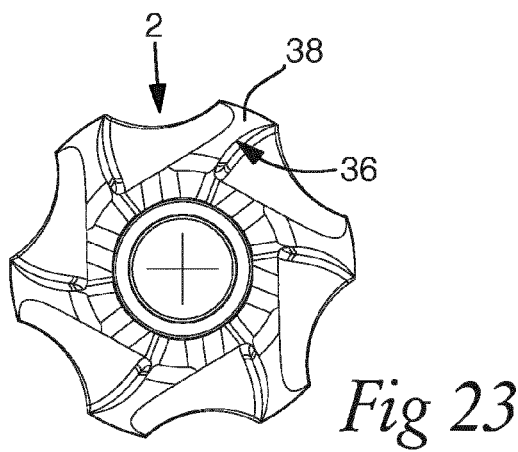
Figure 24:
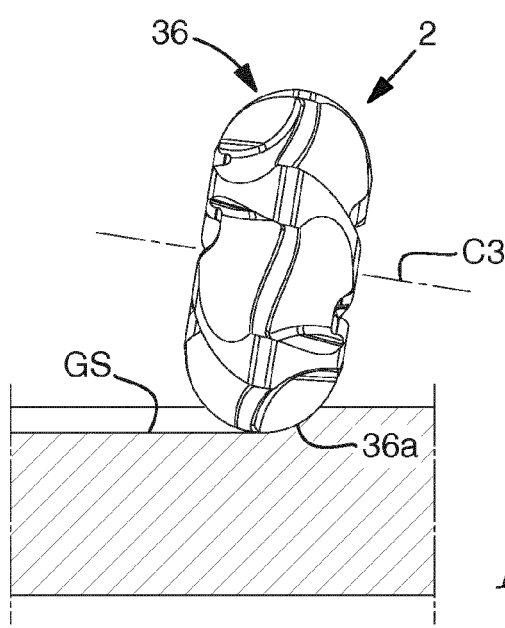

In the drawings:

FIG. 1 is a partly exploded worm's eye view showing a milling tool, in which cutting inserts made in accordance with the invention are included, FIG. 2 is a partly sectioned side view of the milling tool according to FIG. 1, FIG. 3 is an exploded view showing a cutting insert made in accordance with the invention and a seat for the cutting insert included in the basic body of the tool, FIG. 4 is a side view of the same cutting insert, FIG. 5 is a section V-V in FIG. 4, FIG. 6 is an end view VI-VI in FIG. 4, FIG. 7 is an enlarged and simplified end view showing the geometry of the cutting insert in detail, FIG. 8 is a side view VIII-VIII in FIG. 7, FIG. 9 is a very enlarged section IX-IX in FIG. 6, FIG. 10 is a transparent plane elevation of the present cutting insert, FIG. 11 is a simplified side view showing vital geometrical data of the cutting insert, FIG. 12 is a view showing the functional tipping-in position of the cutting insert in connection with the milling of a workpiece, FIGS. 13-16 are a number of views showing an alternative embodiment of the cutting insert, FIGS. 17-20 are a further series of views showing a third alternative embodiment of the cutting insert, and FIGS. 21-24 are yet a series of views showing a fourth alternative embodiment of the cutting insert according to the invention.

DETAILED DESCRIPTION

In FIGS. 1 and 2, there is shown a milling tool having a rotatable basic or tool body 1, which is equipped with a plurality of replaceable and indexable cutting inserts 2 according to the invention. The basic body 1 is rotatable on a centre axis designated C1, in relation to which a rotationally symmetrical envelope surface 3 is generated. The envelope surface 3 extends between a pair of opposite, front and rear ends 4, 5, which generally are flat and extend perpendicular to the centre axis C1. In FIG. 2, a reference plane RP is shown, which is parallel to the plane of the ends 4, 5 and extends perpendicular to the centre axis C1.

In the example, the individual cutting inserts 2 is detachably mounted on a radially outer end of a cutting edge exchange mechanism 6, which is housed in a bore 7, which mouths in the envelope surface 3, more precisely in a transition between the same and the front end plane 4. In the mechanism 6, a spring-loaded ejector 8 is included, by means of which the cutting insert can be thrust outward a distance from the basic body and simultaneously be turned from one index position to another. In FIG. 1, it is shown how the ejectors for all cutting inserts have their inner ends 9 accessible from a central hollow space 10 in the basic body. The inner ends of the ejectors stick inward a distance in this hollow space, whereby all cutting inserts can be ejected by means of a suitable accessory, e.g., a mandrel, which can be pressed into the hollow space 10 and rectilinearly thrust out the ejectors 8, wherein these simultaneously are turned on their centre axes C2. The ejectors are spring-loaded by means of screw compression springs 11 (see FIG. 2), which automatically bring back the ejectors to their initial positions as soon as the mandrel is removed from the hollow space.

In its operative state, the cutting insert 2 is kept fixed in a seat 13 included in the cutting edge exchange mechanism (see FIG. 3), more precisely by means of a screw 14 (see FIG. 1), which, via a hole 15 in the cutting insert, can be tightened in a threaded hole 16, which is included in the movable ejector 8. In the example, the seat 13 is in the form of a rim of alternating cogs 17 and gashes 18, one of two flanks 19, 20 of each cog rising at a fairly steep flank angle (for rotational securing of the cutting insert), while the other flank leans at a flatter angle (for contributing to the turning of the cutting insert, when this is returned to an initial position). In each one of two opposite sides of the cutting insert, there is included an interacting gear rim 21 having alternating cogs 22 and gashes 23. In the operative state, the two gear rims engage each other.

In other embodiments, the milling cutting inserts according to the invention are conventionally, or in another suitable way, mounted in a milling cutter body. Instead of the gear rim described above, the cutting inserts of such embodiments are provided with support surfaces and in certain embodiments also locking surfaces of another type. A support surface may, for example, be a surface on the inside of the cutting insert or along the periphery of the cutting insert, which is intended to abut against surfaces intended therefor in the seat of the milling cutter body. A locking surface may, for example, be situated on a ridge or in a groove and interacts with the corresponding surface of the corresponding member of the milling cutter body. The cutting inserts may be clamped in the seat of the milling cutter body by means of a screw or another suitable clamping device.

Reference is now made to FIGS. 4-12, which in detail illustrate the design of a first embodiment of the cutting insert 2. In general, the cutting insert includes a pair of opposite sides 24, 25, which are axially separated along a centre axis C3. In order to distinguish these sides 24, 25 and facilitate the understanding of the structure of the cutting insert, the first-mentioned one is henceforth denominated outside and the last-mentioned one inside. In the mounted state of the cutting insert, the outside 24 is facing outward from the basic body, and the inside inward toward the same.

In FIGS. 7 and 8, the geometrical basic shape of the cutting insert is shown in simplified form, more precisely so far that the gear rims 21 have been eliminated and replaced by flat, ring-shaped surfaces, which have been designated hub portion 47 and 48. As viewed in plane elevation, the cutting insert has a circular basic shape, which is represented by a dash-dotted circle S, the centre of which coincides with the centre axis C3. The cutting insert is double-sided and invertible by including two identical halves on both sides of a centre plane MP, which extends perpendicular to the centre axis C3 and is parallel to those planes in which the hub portions 47, 48 are located.

Reference is now made to FIG. 11, which schematically shows a geometrical surface of revolution, which is assumed to surround the cutting insert. In each half, on both sides of the centre plane MP, a plurality of part surfaces are included, a first one of which 26—in the example—is conical and extends from the flat hub portion 47 to a first, circular boundary line 27 against a cross-sectionally convexly arched surface 28. This forms a so-called radius transition, which via a second boundary line 29 transforms into a second conical surface 30, which in turn—via a third boundary line 31—transforms into a central girth surface 32, which may be cylindrical.

The angle designated α between the cone surface 26 and the plane of the hub portion 24 is acute and amounts in the example to approx. 33°. The corresponding angle β between the cone surface 30 and said plane is considerably greater, and amounts in the example to approx. 83°. Thus, an imaginary generatrix along the cone surface 30 forms an angle of 7° with the centre axis C3. Together, the surfaces 26, 28, 30 and 32 form an envelope surface generally designated 33 belonging to the outside.

In FIGS. 7 and 8, there is shown how a plurality of chip channels 34 are countersunk in the individual envelope surface 33. Said chip channels are tangentially spaced-apart from each other via ridges 35, which individually include a cutting edge generally designated 36. This is formed between, on one hand, a chip surface 37, which is included in the chip channel 34 and situated on a flank of the individual ridge 35, and, on the other hand, a clearance surface 38, which forms a crest or, in other words, a crown of the individual ridge 35.

Before the cutting insert as such is described further, it should—for the sake of clarity—be emphasized that all (ten in the embodiment illustrated) cutting inserts are tangentially mounted on the basic body 1, as shown in FIGS. 1 and 2. In this state, the cutting insert is fixedly anchored in relation to the basic body and accompanies the same in a planetary, circular path during the rotation of the basic body. Movement of the cutting insert around its own centre axis C3 takes place only in connection with indexing, i.e., stepwise turning up of an individual, fresh cutting edge. In other embodiments, another number of cutting inserts, more or fewer, may be arranged on the milling cutter body.

In this connection, it should be pointed out that the cutting insert includes in total six cutting edges 36 per side, which cutting edges 36 have a uniform pitch of 60° (see FIG. 6). In other embodiments, the cutting insert may have another number of cutting edges and accordingly also ridges/chip channels, more or fewer.

In the area tangentially in front of the individual cutting edge 36, the chip channel 34 is—in addition to the chip surface 37—delimited by a bottom 39, the contour shape of which in plane elevation is determined by boundary lines 40, 41, 42, 43. In the example, the bottom 39 has the shape of a concavely double-arched surface, i.e., a softly arched surface, which is concave as viewed in a cross-section between the boundary lines 40, 42, as well as in a cross-section between the boundary lines 41, 43. The depth of the chip channel is the greatest nearest the boundary line 40 to successively decrease toward the boundary line 42. Along the front part of the boundary line 41, the chip channel 34 transforms into a ridge being in front. The individual cutting edge 36 (see FIG. 7) includes a main edge 36*a*, which extends between two radially separated end points, viz. an inner end point 45 and an outer one 46. The inner end point 45 is situated in the plane of the hub portion 47, while the outer one 46 is situated along the boundary line 27 (see also FIG. 11) between the cone surface 26 and the part surface 28. In the radially outer end point 46, the main edge 36*a* transforms into a convex, arched secondary edge 36*b*, which extends between the boundary lines 27 and 29 of the part surface 28. During milling, the secondary edge 36*b* provides a concave transition between a shoulder cut-out by the main edge and the flat surface generated in the workpiece. As a consequence of the conicity of the surface 26, the inner end point 45 of the main edge 36*a* is located at a greater axial distance from the centre plane MP (or the hub portion 25 of the inside of the cutting insert) than the outer end point 46.

As pointed out above, the cutting edge, in its entirety designated 36, includes a plurality of different part edges, viz. the main edge designated 36*a* and the secondary edge 36*b*. The last-mentioned one extends between the radially outer end point 46 of the main edge 36*a* to an end point 47 (see the left part in FIG. 7). The last-mentioned one is situated along the geometrical boundary line 29 according to FIG. 11, i.e., nearer the centre plane MP than the end point 46.

From the enlarged cross-section in FIG. 9 (see also FIG. 6), it is seen that the clearance surface 38 adjacent to the cutting edge 36 has a cross-sectionally convexly arched shape, more precisely as a consequence of the same coinciding with the conical part surface 26 of the geometrical surface of revolution shown in FIG. 11.

In FIG. 7, it is seen that the outer boundary line 43 of the bottom 39 of the chip channel is concavely curved and spaced apart radially inward from the circumscribed circle S that defines the periphery of the cutting insert. In such a way, a crescent-shaped opening or passage is formed between the chip channel and the flat surface generated in the workpiece. Through this opening, removed chips can freely pass from one side of the cutting insert toward the other.

The two identical halves of the cutting insert on both sides in the centre plane MP are rotationally symmetrical over an axis in the centre plane, which intersects the centre axis so that all cutting edges on both sides should be mountable on a tool body rotating in one and the same direction. As a consequence of this rotationally symmetrical design, ridges 35, in which the cutting edges 36 are included and which are situated on opposite sides, will intersect each other when they are regarded in a transparent plane elevation, of the type shown in FIG. 10, where the ridges turned upward from the plane of the drawing are designated 35*a* and the opposite ones 35*b*. This crosswise disposition of the ridges contributes significantly to a good strength and a long service life of the cutting insert.

In FIG. 7, it is seen that the main edge 36*a* of the individual cutting edge—as viewed in plane elevation—in its entirety is located tangentially behind an imaginary radius r between the centre axis C3 of the cutting insert and the end point 46. This means that the main edge 36*a* obtains a positive cutting geometry in so far that the same "digs" into the material of the workpiece and "lifts out" the chips from the same (rather than thrusting and shearing the material in front of itself, as at negative cutting geometries). In such a way, the cutting edge in its entirety becomes particularly easy-cutting.

In FIGS. 13-16, an alternative embodiment of the cutting insert is shown, which is particularly suitable for the milling of 90° corners. In this case, an edge designated 36*c* forms an integrated, chip removing part edge of the cutting edge 36. When the cutting insert assumes its operative, tipped-in position in the basic body (see FIGS. 2 and 12), the main edge 36*a* and the part edge 36*c* form a right angle with each other. Therefore, during milling, the part edge 36*c* generates a flat bottom surface GS, and the main edge 36*a* a cylindrical surface, while the convex secondary edge 36*b* generates a concave transition surface (a so-called radius transition) between the cylinder surface and the flat bottom surface.

In a third embodiment according to FIGS. 17-20, the cutting insert is formed for quick milling-off of thin surface layers from a workpiece. In this case, the principal chip removal is carried out by means of the part edge 36*c* in combination with the secondary edge 36*b*, more precisely as a consequence of the setting angle of the cutting insert in an operative state being small, e.g. in the order of 1-5°. Normally, a cutting depth that is smaller than the radius of the secondary edge 36*b* is selected, involving that the part edge 36*a* only in exceptional cases is used for chip removal, e.g. when the surface of the workpiece is uneven.

In a fourth embodiment according to FIGS. 21-24, the cutting insert is formed for demanding milling at large cutting depths. In this case, the individual cutting edge 36 is arched along its entire length, more precisely as a consequence of the individual clearance surface 38 coinciding with a surface of revolution, the shape of which is determined by a circular arc-shaped generatrix.

The Function and Advantages of the Cutting Insert According to the Invention

In the operative state, which is shown in FIGS. 2 and 12, the cutting insert 2 assumes a tipped-in position in relation to the flat surface GS to be generated in the workpiece. To this surface GS, the centre axis C1 of the basic body 1 is perpendicular, and hence it follows that the cutting inserts are tilted in relation to the reference plane RP (see FIG. 2). In the example, the cutting insert assumes a position in which its centre axis C3 forms an angle δ of 12° in relation to the surface GS. This means that the main cutting edge 36*a* of the cutting edge 36, as this is regarded in FIG. 12, is tilted at an angle of 33°+12°=45° to the surface GS, wherein 33° is the angle α described above. The principal chip removal is carried out along the main edge 36*a*. Somewhere along the convex secondary edge 36*b*, however, the cutting edge clears from the surface GS, and loses its contact with the workpiece. However, an edge 36*c* goes free from the surface GS. More precisely, this takes place by the angle of the edge 36*c* in relation to the centre axis C3 amounting to 90°–83°=7°, wherein 83° is the angle β described above. In the example, a clearance angle γ of 5° between the edge 36*c* and the surface GS is desired, and therefore δ is selected to 12°, wherein γ=12°–7°.

A primary advantage of the invention is that a large number of cutting edges can be formed in a cutting insert having a circular basic shape—irrespective of whether the cutting insert is single-sided or double-sided—without the size of the cutting insert becoming too large to allow mounting of the cutting insert in the available space in a milling cutter body. Thus, the cutting insert may in practice be formed with 5 to 7 cutting edges in the area of an outside and/or an inside.

Another advantage is that the cutting insert, as a consequence of the clearance surfaces coinciding with a surface of revolution, can, if required, be precision ground to a micrometrical dimensional accuracy in respect of the shape and position of the different cutting edges in relation to the centre axis of the cutting insert.

By the requisite chip channels being formed in the proper cutting insert—which in practice most often is manufactured from wear-resistant cemented carbide—the risk of damage to the basic body, usually manufactured from steel, as a consequence of contact with hammering, hot chips is counteracted. In other words, the cutting insert protects the basic body from the destructive impact of the chips.

Feasible Modifications of the Invention

The invention is not limited only to the embodiments described above and shown in the drawings. Thus, it is feasible to make the cutting insert single-sided instead of double-sided, as has been shown in the drawings, i.e., with only one set of cutting edges and chip channels placed adjacent to the outside of the cutting insert. Furthermore, the cutting insert may be formed with other rotationally securing means than the exemplified gear rims. For instance, the cutting insert could be formed with holes or female-like recesses, in which male-like members included in the basic body engage.

The invention claimed is:

1. An indexable milling cutting insert comprising:
   an opposed outside and inside;
   a periphery;
   a plurality of homologous and alternately individually usable cutting edges; and
   a centre axis, which extends between the outside and inside, wherein the cutting edges are rotationally symmetrically arranged with respect to the centre axis, and wherein the outside side includes a hub portion, which is centred around the centre axis, the outside including a plurality of ridges, which extend from the hub portion toward the periphery;
   a plurality of chip channels countersunk in the outside, wherein the chip channels are tangentially spaced-apart via the ridges, which individually include one of said cutting edges, each one of said cutting edges being formed between, a chip surface, which is situated in a flank of an appurtenant ridge and which is included in a first chip channel, and a clearance surface, which is situated on a crown of the appurtenant ridge and which adjoins a second chip channel.

2. A cutting insert according to claim 1, wherein the clearance surface has a convexly arched shape in arbitrary sections transverse to the ridge, and coinciding with a geometrical surface of revolution situated between the hub portion and the periphery.

3. A cutting insert according to claim 1 wherein the individual chip channel has a depth, which is the greatest nearest the chip surface, and which successively decreases toward an end in which the same transforms into a ridge in front.

4. A cutting insert according to claim 1, wherein a bottom of the chip channel is a concavely double-arched surface.

5. A cutting insert according to claim 1, wherein a peripherally outer boundary line of the chip channel is concavely curved and spaced apart radially inward from a circumscribed circle, which defines the periphery of the cutting insert.

6. A cutting insert according claim 1, wherein at least the main part of the main edge of an individual cutting edge, as viewed in plane elevation, is located tangentially behind an imaginary radius between the centre axis of the cutting insert and an end point of the main edge situated nearest the periphery.

7. A cutting insert according claim 1, wherein the cutting insert is double-sided and invertible by including two identical halves on both sides of a centre plane, which extends perpendicular to the centre axis, the halves being rotationally symmetrical over an axis in the centre plane, which intersects the centre axis.

8. A cutting insert according to claim 7, wherein the ridges included in the respective halves intersect each other in pairs as viewed in an imaginary, transparent plane elevation.

* * * * *